(12) United States Patent
Kent et al.

(10) Patent No.: US 7,006,081 B2
(45) Date of Patent: Feb. 28, 2006

(54) ACOUSTIC TOUCH SENSOR WITH LAMINATED SUBSTRATE

(75) Inventors: Joel Kent, Fremont, CA (US); Robert Adler, Northbrook, IL (US); Paul M. Adriani, Palo Alto, CA (US)

(73) Assignee: Elo TouchSystems, Inc., Menlo Park, CA (US)

( * ) Notice: Subject to any disclaimer, the term of this patent is extended or adjusted under 35 U.S.C. 154(b) by 494 days.

(21) Appl. No.: 09/972,788

(22) Filed: Oct. 5, 2001

(65) Prior Publication Data

US 2002/0104691 A1    Aug. 8, 2002

Related U.S. Application Data

(60) Provisional application No. 60/242,048, filed on Oct. 20, 2000.

(51) Int. Cl.
G09G 5/00 (2006.01)
(52) U.S. Cl. .................. 345/177; 345/156; 345/173
(58) Field of Classification Search ................ 345/173, 345/176, 177, 178; 178/18.01–18.04
See application file for complete search history.

(56) References Cited

U.S. PATENT DOCUMENTS

| | | | |
|---|---|---|---|
| 4,642,423 A | 2/1987 | Adler | |
| 4,644,100 A | 2/1987 | Brenner et al. | |
| 4,645,870 A | 2/1987 | Adler | |
| 4,700,176 A | 10/1987 | Adler | |
| 4,746,914 A | 5/1988 | Adler | |
| 4,791,416 A | 12/1988 | Adler | |
| 4,825,212 A | 4/1989 | Adler et al. | |
| 4,859,996 A | 8/1989 | Adler et al. | |
| 4,880,665 A | 11/1989 | Adler et al. | |
| RE33,151 E | 1/1990 | Adler | |
| 5,072,427 A | 12/1991 | Knowles | |
| 5,162,618 A | 11/1992 | Knowles | |
| 5,177,327 A | 1/1993 | Knowles | |
| 5,243,148 A | 9/1993 | Knowles | |
| 5,260,521 A | 11/1993 | Knowles | |
| 5,329,070 A | 7/1994 | Knowles | |
| 5,334,805 A | 8/1994 | Knowles et al. | |
| 5,451,723 A | 9/1995 | Huang et al. | |
| 5,541,372 A * | 7/1996 | Baller et al. ............. | 178/18.01 |
| 5,573,077 A | 11/1996 | Knowles | |
| 5,591,945 A | 1/1997 | Kent | |
| 5,648,643 A | 7/1997 | Knowles et al. | |
| 5,708,461 A | 1/1998 | Kent | |
| 5,739,479 A | 4/1998 | Davis-Cannon et al. | |
| 5,854,450 A | 12/1998 | Kent | |
| 5,856,820 A | 1/1999 | Weigers et al. | |
| 5,986,224 A | 11/1999 | Kent | |

(Continued)

OTHER PUBLICATIONS

Adler, Robert et al., "Experiments with Love Waves on Layered Glass", Elo TouchSystems, Fremont, CA., 5 pages.

*Primary Examiner*—Sumati Lefkowitz
*Assistant Examiner*—Alecia D. Nelson

(57) ABSTRACT

The present invention is directed to a multilayer substrate for use in touchscreen and touch sensor applications. The substrate, including a microsheet, a polymer sheet, and a plate supports the propagation of acoustic waves, including Love waves and Rayleigh-like waves. The microsheet and plate may be fabricated from glass, metal, or other suitable materials depending on the desired application for the touchscreen. The polymer sheet may be fabricated from polystyrene, polyacrylates, polyether sulfones, or polycyclic olefins. The disclosed touchscreen substrates are thin but durable and have increased touch sensitivity with decreased sensitivity to water and other surface contaminants.

11 Claims, 8 Drawing Sheets

U.S. PATENT DOCUMENTS

| | | | |
|---|---|---|---|
| 6,078,315 A * | 6/2000 | Huang ................. 345/177 |
| 6,087,599 A | 7/2000 | Knowles |
| 6,091,406 A | 7/2000 | Kambara et al. |
| 6,225,985 B1 | 5/2001 | Armstrong et al. |
| 6,236,691 B1 | 5/2001 | Johnson |
| 2003/0137498 A1 * | 7/2003 | Huang et al. ............. 345/173 |

* cited by examiner

ACOUSTIC TOUCH SENSOR WITH LAMINATED SUBSTRATE

This application claims the benefit of U.S. Provisional Application No. 60/242,048 filed on Oct. 20,2000.

FIELD OF THE INVENTION

The present invention relates to acoustic touchscreen substrates. In particular, the present invention relates to multilayer touchscreen substrates, which support both Love waves and Rayleigh-like waves.

BACKGROUND OF THE INVENTION

Touchscreens, which as used herein include touch sensors, are transparent or opaque input devices for computer and other electronic systems. Transparent touchscreens are generally placed over display devices such as cathode-ray-tube monitors and liquid crystal displays. In this manner, touch display systems are created which are increasingly used for commercial applications including restaurant order entry systems, industrial process control applications, interactive museum exhibits, public information kiosks, pagers, cellular phones, and personal digital assistants.

Presently, the dominant touch technologies are resistive, capacitive, infrared and acoustic. Such touchscreens have delivered high standards of performance at cost-competitive prices. Acoustic touchscreens, also known as "ultrasonic" touchscreens, have been able to compete effectively with the other touch technologies. This is due in large part to the ability of acoustic touchscreens to handle demanding applications with high-transparency, high-resolution touch performance, while providing a durable touch surface. As acoustic touchscreen technology continues to develop, a durable touch surface is expected to remain a key selling feature and product requirement.

Touchscreens based on the use of acoustic waves are touch-sensitive substrates in which the acoustic wave is propagated in a substrate, and a touch at a position on the substrate results in absorption of at least a portion of the wave propagated in the substrate. The touch position is determined by using electronic circuitry to locate the absorption position in an XY coordinate system. A common type of acoustic touchscreen employs Rayleigh type acoustic waves, which as used herein includes quasi-Rayleigh waves. Illustrative disclosures relevant to Rayleigh wave touchscreens include U.S. Pat. Nos. 4,642,423; 4,645,870; 4,700,176; 4,746,914; 4,791,416; Re 33,151; 4,825,212; 4,859,996; 4,880,665; 4,644,100; 5,739,479; 5,708,461; 5,854,450; 5,986,224; 6,091,406; 6,225,985; and 6,236,691. Acoustic touchscreens employing other types of acoustic waves such as Lamb or shear waves, or combinations of different types of acoustic waves (including combinations involving Rayleigh waves) are also known, illustrative disclosures including U.S. Pat. Nos. 5,591,945; 5,854,450; 5,072,427; 5,162,618; 5,177,327; 5,329,070; 5,573,077; 6,087,599; 5,260,521; and 5,856,820. All of the above-cited patents are incorporated herein by reference.

Acoustic touchscreens, including the Elo TouchSystems, Inc. IntelliTouch® products which sense touch via absorption of Rayleigh waves have proven to be commercially successful. The success of products using Rayleigh waves is due in large part to the following two properties of Rayleigh waves. First, Rayleigh waves have a higher sensitivity to touch than other acoustic waves. Second, Rayleigh waves are surface waves that can propagate on the surface any simple homogenous glass substrate.

Rayleigh waves, however, also have drawbacks. For example, in order for Rayleigh waves to propagate in a touchscreen substrate, the substrate generally must be three to four times thicker than the wavelength of the wave imparted into the substrate. Therefore, Rayleigh waves require relatively thick heavy substrates, which are not conducive for a variety of applications including portable electronic devices having touchscreens.

In addition, because Rayleigh waves are confined at or near the surface of the substrate, Rayleigh wave touchscreens have increased sensitivity to liquid contaminants such as oil and water and other materials abutting the touchscreen surface, such as sealants. Contaminants or other abutting materials absorb energy from the propagating waves and may cause acoustic shadows or blind spots extending along the axes of the substrate that intersect the contaminant. As a result, the touchscreen substrate cannot detect a touch along blind axes. Thus, there is a need for particular care in exposing Rayleigh wave touchscreens to water and designing the seals between the exposed touch surface and enclosed areas of the touchscreen substrate. For applications subject to high levels of liquid contaminants, use of Rayleigh waves becomes problematic.

The ability to optimize the performance of a Rayleigh wave touchscreen is limited because touch sensitivity and minimum touch panel thickness are not independent choices. In order to support Rayleigh waves in a touchscreen of reduced thickness, its other dimensions remaining the same, the wavelength or frequency must be reduced to preserve single surface confinement of the acoustic wave. It is characteristic of Rayleigh waves that their confinement depth is related to wavelength, with confinement depth decreasing as wavelength is reduced. As a result, the wave is confined to a shallower region bounded by the surface, and the proportion of wave energy absorbed by a given absorbing medium is increased. Experimentally, this is found to vary by approximately the inverse square of the wavelength. As previously discussed, touchscreens using Rayleigh waves can be considered unduly sensitive for some applications, even for relatively thick panels; hence, the effect of reducing touch panel thickness results in touchscreens which are even more sensitive to surface contaminants and other abutting materials. Conversely, reducing the sensitivity by increasing the quasi-Rayleigh wavelength results in increased panel thickness and weight. Finally, commercial economics of touchscreen mass production often favor the use of the same electronics at the same operating frequencies for a broad line of touchscreens. Thus, there is a need for a Rayleigh wave touchscreen in which the sensitivity, minimum thickness, and weight can be varied without changing the wavelength of the waves.

Shear wave mode touchscreens are also well known in the art. These systems operate by exciting zeroth order horizontally polarized shear waves (ZOHPS), which are non-dispersive, in a substrate. Such touchscreens are described and illustrated in U.S. Pat. Nos. 5,177,327 and 5,329,070 both to Knowles and were commercially sold by Exzec Inc. and Carroll Touch Inc. under the name SureTouch™.

Some of the disadvantages of Rayleigh wave touchscreens can be avoided if horizontally polarized shear waves, which may also be referred to herein as "shear waves," are used in the touchscreen. For example, shear waves can be supported in arbitrarily thin substrates, and in fact, the substrate should be maintained at a thickness less than about two wavelengths in order to suppress higher order wave modes and overtones. Thus, shear wave touchscreens are well suited for applications in which the weight of the touchscreen must be minimized.

However, very thin substrates, such as 1 mm thick soda-lime glass originally used in shear wave touchscreens, are not durable. In order to increase the thickness and hence the durability of the 1 mm glass substrate, the substrate in which the shear wave propagated was laminated to a back plate using a non shear-wave-coupling adhesive. A suitable adhesive used to bond the substrate to the back plate is a silicone rubber adhesive which remains liquid-like even after curing.

U.S. Pat. No. 5,856,820 to Weigers et al. discloses a process used for laminating shear wave supporting SureTouch™ substrates. The laminated SureTouch™ substrate, however, cannot withstand the chemically etched and inlayed reflective array process also disclosed in U.S. Pat. No. 5,648,643. For example, silicone rubber will not survive the high sintering temperature needed to cure the silver frit inlay material disclosed in the patent. Therefore, the disclosed lamination process is a downstream manufacturing process, which occurs after the fabrication of reflective arrays in the 1 mm thick acoustic substrate. The expense of a downstream lamination process adds significant cost to the manufacturing process. There remains a need to provide a durable shear wave supporting touchscreen substrate which is water-resistant, but which can be manufactured without the expense of a downstream lamination process.

U.S. Pat. No. 5,591,945 to Kent discloses a shear wave touchscreen constructed from a 2.3 mm thick glass substrate. This touchscreen uses higher-order-horizontally-polarized-shear wave (HOHPS) to sense a touch. As set forth in this patent, Rayleigh waves propagate along the arrays and are mode converted to an n=4 HOHPS waves by non-45° reflectors.

For many applications, a 2.3 mm thick glass substrate is structurally strong enough to eliminate the need for laminated substrates; however, such HOHPS supporting touchscreens also have disadvantages. For example, a 2.3 mm thick glass HOHPS supporting substrate also supports many other additional acoustic modes including other orders of HOHPS waves, the ZOHPS waves, Rayleigh waves, and a large number of Lamb waves. Such additional acoustic modes can lead to undesired parasitic acoustic signals. HOHPS wave based acoustic touchscreens have yet to be demonstrated in the marketplace. Accordingly, there remains an unmet need to provide a low-cost yet durable touchscreen substrate, which supports desired water-resistant shear waves, while supporting a minimum of other extraneous acoustic modes.

Unlike Rayleigh wave touch screens, shear wave touchscreens can properly reconstruct touch positions even in the presence of high levels of surface contamination. Operation continues even with complete submersion of the touch surface under water. The physical mechanism for the relative insensitivity to water and other contaminants by horizontally polarized shear waves is set forth below. In contrast to Rayleigh waves, shear waves induce only horizontal motion in the substrate and have no vertical motion at the surface of the touchscreen substrate. As a result, Rayleigh waves and shear waves have contrasting touch sensing properties. The vertical motion of the substrate surface associated with Rayleigh waves results in absorption via radiation of pressure waves into the contacting media. Absorption by a finger touch and a water drop of the same contact area are similar. Shear waves, however, do not radiate pressure waves into the contacting media, but rather are absorbed mainly by viscous damping. As water is much less viscous than finger flesh, a shear wave will respond much less to a water drop than a finger touch. For acoustic touchscreen applications subject to significant contamination from water or other liquids, horizontally polarized shear waves provide a major advantage over the use of Rayleigh waves.

Although shear waves have reduced sensitivity to water and other contaminants, shear waves also tend to be much less sensitive to touch than Rayleigh waves. The percentage of intercepted energy absorbed by a given touch is about five times greater for a Rayleigh wave than it is for a comparable ZOHPS shear wave for practical touchscreen substrate thicknesses. In order to compensate for this difference in fundamental acoustic sensitivity, special controllers are needed for a touchscreen using ZOHPS waves. These controllers are more complex than those needed for Rayleigh wave touchscreens and, therefore, add cost to the controller design. Thus, it would be desirable to have the benefits of a shear wave touchscreen without a corresponding reduction in the raw touch signal strength so that less complicated and less expensive controllers may be used.

Love wave touchscreens are also known in the art, but have yet to be commercially developed. In general, a Love wave is a horizontally polarized shear wave having wave energy at one surface of the substrate and substantially less energy on the opposing surface. Like a Rayleigh wave, a Love wave is bound to the touch surface and decays in an exponential fashion with depth. Unlike a Rayleigh wave, Love waves do not exist in a homogenous medium. Mathematically, the simplest substrate supporting a Love wave is an upper layer of finite thickness bonded to a lower semi-infinite medium exhibiting a faster bulk shear wave velocity. Practically speaking, the lower medium may be a layer of finite thickness provided it is thick enough to contain a large number of exponential decay lengths of the wave amplitude. More complex structures with multiple layers may also support Love waves.

The use of Love waves as a means to allow operation in the presence of low-viscosity fluids is well known in the field of acoustic chemical sensors. See, for example, Gizeli et al., "Novel Love-plate acoustic sensor utilizing polymer overlays", Trans. UFFC September 1992, p. 657; Jakoby and Vellekoop, "Analysis and Optimization of Love Wave Sensors", Trans. UFFC September 1998, p. 1293; and Jakoby and Vellekoop, "Analysis of Viscous Losses in the Chemical Interface Layer of Love Wave Sensors", Trans. UFFC May 2000, p. 696. While these disclosures illustrate basic principles, they are rather far removed in a practical engineering sense from touchscreen technology. The active areas of chemical sensors are typically very small, e.g. fractions of a square inch, and transparency is irrelevant. Love wave substrates for chemical sensors are typically piezoelectric in order to enable use of interdigital transducers. In contrast, touchscreens are generally many tens to hundreds of square inches in area. For economic reasons, substrates for commercial acoustic touchscreens are not made of piezoelectric materials, and transparency is essential for many applications. Thus, chemical sensor prior art gives few clues how to cost-effectively design and manufacture Love wave substrates for acoustic touchscreens.

Love wave touchscreens have been disclosed implicitly and explicitly in the prior art. For example U.S. Pat. No. 5,329,070 to Knowles can be interpreted as disclosing a Love wave substrate in which a slower shear velocity medium is bonded on a back plate of faster shear velocity. U.S. Pat. No. 5,591,945 to Kent discloses the use of Love wave supporting substrates comprising a 2 mm or 3 mm thick borosilicate glass bonded to 3 mm thick soda-lime glass. In addition, U.S. Pat. No. 5,854,450 to Kent discloses that that a Love wave substrate can contain laminations of more than two layers. U.S. Pat. No. 5,854,450 discloses possible Love wave substrate constructions including a 100 micron lead-based frit layer on 2 mm thick glass, enamel on aluminum, and glaze on ceramic.

Substrates for touchscreens placed in front of display devices must be transparent. In a touch display system, it is desirable to provide the touch input function with minimal impact on the quality of the displayed image as seen by the user. However, for some applications, touch input devices need not be transparent. For example, consider track pads, which like a mouse, allow the user to control a cursor. For certain market applications, there may be an opportunity for improved acoustic substrate designs even if they are opaque.

As discussed in U.S. Pat. No. 5,854,450, acoustic sensors can be designed in a variety of shapes for a variety of applications and may have application beyond user control of a computer-based system. For example, the cylindrical sensor shown in FIG. 19 of U.S. Pat. No. 5,854,450 could be a partial metal shell of a robot arm. Thus, large exposed areas could be rendered touch sensitive and used for collision detection. Sensor information could be used in a robot system to decide when to abort or modify robot arm movements. If the application demands rejection of false collision information due to water contamination, then it is advantageous to use a shear wave mode. This is another touch sensor application that may benefit from improved touch substrates.

Accordingly, it is believed that there is a need for improved acoustic touchscreen substrates which support Rayleigh and Love waves, are durable and have increased sensitivity to touch, but which are still relatively insensitive to water and other contaminants. It is further believed that there is a need for such touchscreens substrates, which can be easily manufactured at a low cost.

BRIEF SUMMARY OF THE INVENTION

In accordance with the present invention, the disadvantages of prior art laminated acoustic wave touchscreen substrates have been overcome. The laminated touchscreen substrate of the present invention includes a microsheet (the touch surface), a plate, and a polymer sheet positioned between the plate and microsheet. The microsheet, polymer sheet, and plate individually all support bulk shear waves. Thus, the substrate of the present invention can be utilized in Love-Love-Love, Rayleigh-Rayleigh-Rayleigh, and Rayleigh-Love-Rayleigh touchscreens. Rayleigh waves and Rayleigh-like waves as discussed herein include any surface bound wave with vertical and longitudinal motion.

In one embodiment, the microsheet and plate are glass and the polymer has a high transparency, forming a glass/polymer/glass substrate suitable for use in transparent applications such as displays. In another embodiment, the microsheet and plate may be metal, thus forming a metal/polymer/metal substrate suitable for opaque applications such as keypads, track pads, and robot shell sensors.

The use of the polymer sheet in the substrate of the present invention provides numerous advantages. In a Love-Love-Love substrate, the polymer sheet plays an essential and important role by reducing the amplitude of the evanescent wave in the plate which in turn increases the sensitivity of the substrate, without decreasing the substrate's insensitivity to water and other contaminants.

In addition, the polymer sheet allows for the creation of a Rayleigh-Rayleigh-Rayleigh substrate of reduced thickness and therefore reduced weight. In particular, a Rayleigh-Rayleigh-Rayleigh substrate having a total thickness of less than 1 mm is possible because present invention allows the thickness of the plate to be reduced by a factor of three. This allows Rayleigh-Rayleigh-Rayleigh substrates with high sensitivity to be used for portable touchscreen applications.

Furthermore, the touchscreen substrates of the present invention have increased durability over the prior art two-layer polymer/plate substrates because the polymer layer is protected by the microsheet.

Finally, another advantage of the substrate of the present invention is that it may be easily manufactured on a very cost effective basis.

These and other objects, advantages, and novel features of the present invention will be more fully understood from the following drawings and description.

DETAILED DESCRIPTION OF THE INVENTION

Figure 1:
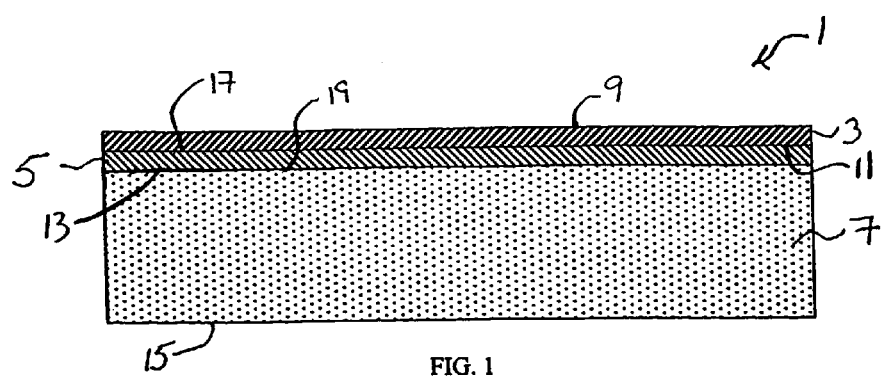
FIG. 1 is a cross-sectional view of a first embodiment of a touchscreen substrate of the present invention.

Referring now to FIG. 1, the touchscreen substrate 1 of the present invention has a top microsheet 3 as the touch surface, an intermediate polymer sheet 5, and a bottom plate 7. The microsheet 3 has an upper surface 9 and a lower surface 11 and is generally a shear-wave-supporting, hard, and scratch-resistant material, which provides surface strength and durability to the overall substrate. However, if the plate 7 has deviations in its flatness, the microsheet 3 must be thin enough to remain somewhat flexible in order to conform to the plate 7 during the lamination process. A thin microsheet is also advantageous as it provides desirable acoustic characteristics and allows for the manufacture of a lower cost touchscreen substrate.

The microsheet may be glass, metal, ceramic, any other material having similar acoustic properties as well as composites of thereof. In a preferred embodiment, the thickness of the microsheet is less than about 300 microns. For applications in which a touchscreen is placed in front of a display, the microsheet must be transparent and may be made from glass. Suitable glasses for forming the microsheet include soda-lime glass, crown glass, borosilicate glass, and barium, strontium, and lead containing glasses. For touchscreen applications such as keypads, track pads, and underwater robot shells, the microsheet may be an opaque material, such as metal, including but not limited to aluminum and steel. Examples of preferred microsheets suitable for use in the present invention are listed in Table 1 below.

TABLE 1

| Microsheet Trade name | Nominal thickness (microns) | Mass Density (g/cm$^3$) | Composition |
| --- | --- | --- | --- |
| Corning ® 0211 | 66, 145, or 220 | 2.53 | Soda-lime (low soda content) |
| Schott ® D-263 | 100 | 2.51 | Borosilicate |
| Schott ® AF-45 | 100 | 2.72 | Modified borosilicate including high content of BaO |

For all microsheet thicknesses in Table 1, including the 220 micron thick Corning 0211, the microsheet had the necessary flexibility to conform to the shape of the underlying glass plate during the pressure and temperature bonding process. Because stiffness of the microsheet is proportional to the cube of the thickness, a glass microsheet 220 microns thick is about 100 times more flexible than a 1 mm thick glass sheet. A glass microsheet 100 microns thick is 10 times more flexible than a glass sheet 220 microns thick. Accordingly, it is believed that a glass microsheet with a thickness less than about 300 microns has the flexibility to support the lamination process, but that a 1 mm thick sheet of glass would not be sufficiently flexible to conform to the underlying glass plate.

The bottom plate 7 is the main structural layer of the touchscreen substrate and has an upper surface 13 and a lower surface 15. Like the microsheet 3, the plate 7 is also a shear-wave-supporting material. In addition, the plate 7 preferably has relatively low acoustic attenuation. When the substrate 1 is used in a transparent touchscreen application, the plate 7 may be formed from a variety of glasses, including those discussed with respect to the microsheet 3. Preferably, the plate 7 is formed from soda-lime glass because of its low cost. While soda-lime glass plates will be nominally flat, they will deviate slightly from ideal flatness when there is no downstream grinding or polishing of the glass. For opaque touchscreen applications such as key pads, a robot shell sensor and the like, the plate 7 may be formed from a metal having acceptable acoustic losses such as aluminum, steel, or combinations thereof, as well ceramic.

Regardless of whether the plate 7 is glass, metal, or another material, the plate 7 should be thick enough to impart rigidity to the overall touchscreen substrate. If the plate is glass, the plate may have a thickness greater than about 2 mm in order to provide the necessary rigidity. In a preferred embodiment, the plate is a 3 mm thick sheet of soda-lime glass. If the plate is metal, the plate may be as thick as necessary to provide the desired mechanical rigidity. In a preferred embodiment, the plate is a 3 mm thick sheet of aluminum or steel.

The microsheet 3 and the plate 7 are not bonded directly to each other, but rather are bonded to the intermediate polymer sheet 5 to form a multilayer touchscreen substrate 1. The polymer sheet 5 has an upper surface 17 and a lower surface 19 and, in isolation, supports bulk shear waves or is "shear supporting." Preferably, the polymers used in the polymer sheets have high transparency, have glass transition temperatures of at least 260° K, and have low acoustic attenuation. In addition, it is advantageous if the polymers have low moisture absorption and are environmentally stable. Such polymers include crystalline and glass type polymers.

Compared to the prior art two-layer polymer/glass touchscreen substrates, a three-layer glass/polymer/glass substrate has the virtue of "burying" the polymer sheet, and, therefore, allowing the use of more brittle and less impact resistant polymers. Furthermore, with the polymer positioned between the microsheet 3 and the plate 7, scratch resistance of the polymer is no longer a concern. As a result, there is a greater freedom of choice of the type of polymer that may be used for the polymer sheet 5.

Suitable polymers for the polymer sheet 5 include polystyrene, polyacrylates, polyether sulfones, polycyclic olefins, and combinations thereof. It should be noted that silicone rubber is a non shear-wave-coupling material, and, therefore, cannot be used as the intermediate sheet in the present invention. Thin polymer sheets having a uniform thickness are commercially available at a low cost. A suitable polymer sheet includes a polystyrene film manufactured by Dow and sold under the trade name Styron®. In a preferred embodiment, the polymer sheet has a thickness less than about 300 microns which ensures that that the polymer sheet is sufficiently flexible to conform to any deviations which may occur in the plate. In another preferred embodiment, the polymer is a general-purpose polystyrene, as opposed to a high impact polystyrene which contains rubbery domains. General-purpose polystyrene is particularly suitable because it is inexpensive, has little damping effect on acoustic waves, and allows for a suitable wave velocity in the range of 1150 m/s. A preferred polymer sheet for use in the present invention is a 32 micron thick polystyrene sheet manufactured by Kama, Inc. and available from MultiPlastics in Santa Fe Springs, Calif. In addition to commercially available pre-formed polymer sheets, it is contemplated that the polymer sheet 5 may be formed by in situ polymerization as discussed in detail in Example 3 below.

To provide uniform acoustic properties, it is preferable that the intermediate polymer sheet 5 be of uniform thickness despite deviations in flatness of the plate 7. For this reason, the polymer sheet 5 should be flexible so that it will conform to the plate during the lamination process. The flexibility of the polymer sheet 5 is easily increased by selecting a lamination temperature, which is higher than the polymer glass transition temperature and below the polymer melt temperature. Furthermore the flexibility of the polymer is greatly increased by selecting temperatures above the polymer melt temperature and using the highly viscous melt to maintain a substantially uniform thickness while conforming to the variations of the plate 7.

The microsheet 3, polymer sheet 5, and the plate 7 are laminated together to form the touchscreen substrate. Because the substrate may be subjected to changes in temperature, humidity, and a variety of mechanical forces in use, it is important to provide a strong bond between the microsheet 3, the polymer sheet 5, and the plate 7. Physical lamination of the microsheet, polymer sheet, and plate may be accomplished by any method known in the art, including but not limited to, the use of pressure, heat and pressure, or heat and pressure with a coupling agent.

Covalent bonding at the interfaces between the polymer sheet 5 and the microsheet 3 and the plate 7 is particularly suitable for many touchscreen applications. Strong covalent bonds may be created with the use of a coupling agent. Suitable coupling agents for bonding polymers to glass or metal substrates are well known in the art and are widely available from a variety of chemical companies including Gelest, Inc. in Tullytown, Pa. In a preferred embodiment, a silane coupling agent is used to form the desired covalent bonds between the upper surface 17 of the polymer sheet 5 and the lower surface of 11 of the microsheet 3, and the lower surface 19 of the polymer sheet and the upper surface 13 of the plate 7. The use of a silane chemistry covalent bonding system is advantageous because unlike typical contact adhesives, which are highly absorptive of acoustic waves, the thin silane coating does not affect the propagation of acoustic waves. In addition, silane chemistry supports the use of mild temperatures and pressures in a low cost touchscreen substrate lamination process.

EXAMPLE 1

Three-layer touchscreen substrates of the present invention shown in FIG. 1 were constructed using all three microsheets in Table 1, a 3 mm thick sheet of soda-lime glass for the plate 7, and a 32 micron thick sheet of polystyrene. One side of the microsheet 3 and one side of the plate 7 were each dipped into a 0.1% azido sulfonate silane methyl ethyl ketone (MEK) coating solution. Alternatively, it is contemplated that the entire polymer sheet could be dipped into the silane coating solution. The microsheet and the plate were then air-dried and cured in an oven at 110° C. for a sufficient time to covalently bond the silane molecules to the glass microsheet and plate. During the drying process, solvent in the coating solution is evaporated off leaving a silane coating a few molecules thick on the microsheet and plate. The thickness of the silane coating is negligible, and therefore, does not add to the thickness of the substrate. Subsequently, the layers of the touchscreen substrate were stacked such that the polymer sheet 5 was placed between the silane coated sides of the microsheet 3 and plate 7. Teflon® sheets were then placed on the upper surface 9 of the microsheet and the lower surface 15 of the plate 7. The stacked substrate with Teflon® sheets was then placed between silicone rubber sheets and inserted between two steel plates in a hot press at 200° C. and 10,000 pounds for five minutes to securely bond the layers of the touchscreen substrate. The bonded substrate was then cooled for three minutes at 5000 pounds. Successful lamination of the substrates without gaps or bubbles demonstrates that the glass microsheet did indeed flex and conform to the glass plate's shape during the lamination process.

In order to test the substrates made in accordance with Example 1, transducers were constructed to excite and detect Love waves at 5.53 MHz (the standard operating frequency of Rayleigh-wave IntelliTouch® acoustic touchscreens of Elo TouchSystems, Inc.). The transducer assembly made contact with the substrate via a narrow steel edge 7.4 mm long. In transmit mode, the narrow edge was excited in a shear motion parallel to the edge, and generated shear waves which propagated perpendicular to the edge. Time of flight and decay length experiments were performed by placing a transmit/receive pair of transducers at various separation distances. Love waves were indeed observed in each of the substrates corresponding to the three types of microsheets listed in Table 1 above.

One sample in particular supported a Love wave with interesting acoustic properties. The acoustic properties for this sample are set forth below in Table II.

TABLE II

| Layer | Thickness ($\mu$m) | Shear Velocity (mm/$\mu$sec) | Density (g/cm$^3$) |
|---|---|---|---|
| AF-45 microsheet | 100 | 3.07 | 2.27 |
| Polystyrene film | 32 | 1.15 | 1.05 |
| Soda-lime glass plate | 3000 | 3.40 | 2.24 |

In this preferred embodiment, the energy of the Love wave is highly concentrated in the microsheet at the touch surface, leading to a touch sensitivity which is much greater than that typically observed for a horizontally polarized shear wave. The presence of the polymer layer of finite thickness plays an essential acoustic role in increasing sensitivity by greatly reducing the amplitude of the evanescent wave in the plate. In fact, the touch sensitivity of the substrate in Table II is comparable to that of the prior art Rayleigh wave substrates. Despite its increased sensitivity, the substrate remained substantially unaffected by the presence of water or other contaminants as in the case of the prior art two-layer substrates using shear mode waves.

To better understand the mechanisms leading to the surprisingly high touch sensitivity for shear mode waves in the present invention, the Love wave amplitude versus depth profile was mathematically computed for various three-layer substrates of the present invention. Calculations confirmed that the sample should indeed have high touch sensitivity, namely 8.4 times the sensitivity of a ZOPHS wave in 1 mm thick soda-lime glass substrate. Table III below compares experimental observations with theoretical predictions.

TABLE III

| Property | Experiment | Theory |
|---|---|---|
| Touch sensitivity | "very high touch sensitivity" | 8.4 times the sensitivity of ZOPHS wave in 1 mm glass |
| Water rejection | "unaffected by water" | Love waves are used |
| Phase velocity | 3.10 mm/$\mu$sec | 3.13 mm/$\mu$sec |
| Group velocity | 2.87 mm/$\mu$sec | 2.93 mm/$\mu$sec |
| Group velocity dispersion | <½% for ±5% frequency variation | <0.1% for ±5% frequency variation |

Given that the parameters used in the theoretical calculations are not exact, the agreement between computed and measured phase and group velocities is excellent. Furthermore, the observed lack of variation of group velocity with frequency was at first surprising, but then made sense after theoretical calculations showed that the group velocity was at a minimum as a function of frequency. The combination of experimental observations and theoretical calculations provided a greater understanding of underlying mechanisms and resulted in the following insight.

When the bulk shear velocity in the microsheet is significantly less than the bulk shear velocity in the glass plate, acoustic energy becomes highly concentrated in the thin microsheet layer resulting in the observed high touch sensitivity. For the substrate set forth in Table II, computations show that 83% of the acoustic power is contained in the microsheet layer, 6% of the acoustic energy in the polystyrene layer, and 11% in the soda-lime glass. In a preferred embodiment using Love wave touchscreen substrates, the microsheet shear velocity is at least 5% lower than the glass plate shear velocity.

Interestingly, the above touch sensitivity significantly exceeds what is possible with a two-layer Love-wave substrate. Calculations were performed for a hypothetical two-layer structure of AF-45 microsheet bonded directly the soda-lime glass plate. The touch sensitivity was reduced to 3.643 times the sensitivity of a ZOPHS wave in a 1 mm glass substrate. This illustrates that the polymer plays an important role. Because the polymer sheet is relatively soft, it allows the wave to decrease rapidly in amplitude before it reaches the plate. The thickness of the (hypothetical) microsheet was then varied until a maximum touch sensitivity (acoustic power density at the surface) was found. At a thickness of 170 microns, the touch sensitivity was about 4.0 times that of a ZOPHS wave in 1 mm thick glass substrate. This is still a factor of two less than that achieved with the three-layer Love wave substrate of Table II. The polymer layer not only plays an essential role in the manufacturing process, it clearly contributes to an enhanced wave-guiding effect that enhances touch sensitivity.

As noted above, only a relatively small percent, 6%, of the acoustic power of the Love wave propagates in the polystyrene layer. Polymers tend to be much more acoustically absorptive than glass. However, even if the polymer absorbs bulk shear waves at several times the rate of glass, this effect is weighted by 6%. Therefore, as previously discussed, the use of polymer materials, such as polyacrylates, that would otherwise be considered much too acoustically absorptive for use in a touchscreen substrate may be used in the present invention.

EXAMPLE 2

Destructive impact strength tests were performed on touchscreen substrates made according to the process set forth in Example 1. The touchscreen substrates were made from a 100 micron thick Schott D-263 microsheet, a 32 micron thick polystyrene sheet, and a 3 mm thick soda-lime glass plate. The soda-lime glass plate had dimensions of approximately 19 cm×24 cm, with the microsheet and polystyrene sheet being slightly smaller than the plate. A 5 cm diameter steel ball was dropped from increasing heights on each of the two samples. The drop height started at 15 cm and was increased in 5 cm increments. Both samples survived the impact of the falling steel ball with no visible effects until a drop height of 40 cm was reached. Both samples failed at 40 cm. Interestingly, the failure appeared to be in the 3 mm thick soda-lime glass plate, not the 100 micron thick glass microsheet. Fractured shards of the 3 mm thick glass plate remained bonded to the polystyrene sheet which remained bonded to the unfractured microsheet. The lamination appeared to fail only when the 3 mm thick soda-lime glass plate failed. Thus, it is expected that increasing the thickness of the glass plate will further increase the impact resistance of the touchscreen substrate of the present invention.

This experimental evidence for the impact strength of the front surface of the three-layer touchscreen substrate of the present invention is surprising. Before assembling and laminating the touchscreen substrate, the glass microsheet is quite fragile and must be handled with some care. However, after lamination, the microsheet layer is well supported and constrained to avoid tight radius bends that induce fractures in the glass microsheet.

EXAMPLE 3

Figure 2:
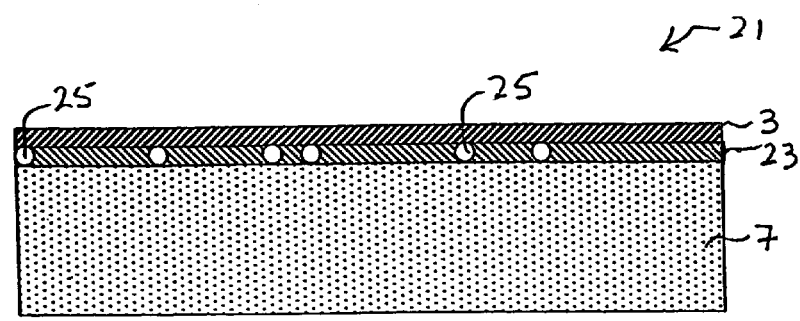
FIG. 2 is a cross-sectional view of a second embodiment of a touchscreen substrate of the present invention.

FIG. 2 illustrates another embodiment of a touchscreen substrate of the present invention. The substrate 21 comprises a microsheet 3 and a plate 7 as shown in FIG. 1. The intermediate sheet 23, however, is not a separate flexible polymer sheet as described in Example 1. Rather, the intermediate polymer sheet 23 is formed by in situ polymerization.

An uncured polymer base material is formed into a polymer precursor. The polymer precursor may comprise, but is not limited to, polystyrene, polyacrylate, polyether sulfones, polycyclic olefins, or combinations thereof, and may be a liquid or a liquid with fillers. In a preferred embodiment, the polymer precursor is a polyacrylate based liquid system. Such polyacrylate systems have good bonding properties, are inexpensive, have high environmental resistance, and have high light transparency. Moreover, a separate coupling agent is not necessary to achieve bonding of the substrate layers with an acrylic based system.

In order to ensure that the polymer sheet formed in situ has a uniform thickness and hence the top microsheet 3 will conform to any existing variations in the plate 7, small spacer particles 25 may be added to the polymer precursor. The diameter of the spacer particles 25 determines the actual the thickness of the polymer sheet, and thus, the thickness of the polymer sheet may be modified by using smaller or larger spacer particles as required. The spacer particles may be glass beads or polymer beads with a higher melting point than the peak temperature of the in situ polymerization process. In a preferred embodiment, the spacer particles 25 have the same or similar acoustics properties as the polymer. If a transparent Love wave touchscreen substrate is desired, the spacer particles 25 are preferably transparent and have an index of refraction that is similar to the refraction index of the cured polymer.

The polymer precursor may be spin-coated onto the microsheet 3 or plate 7 in a uniform layer or spread onto the microsheet 3 or plate 7 in a uniform layer with a knife, such as doctor blade. Thereafter, the substrate layers are stacked such that the exposed surface of the polymer precursor layer is covered. The stacked substrate is then placed in a hot press as discussed in Example 1 in order to laminate the layers. In situ polymerization of the polymer precursor may then be effected by any one of the following methods. For example, UV activators may be added to the polymer precursor so that subjecting the plate and precursor to UV radiation polymerizes the precursor. Alternatively, a single or multicomponent thermoset polymerization system activated by a temperature cycle may be used. In addition, polymerization can be achieved by mixing reactive components at ambient temperature or by reacting the polymer precursor with ambient moisture on the surface of the plate or in the air. Alternatively, polymerization may be achieved by any lamination that blocks contact with ambient air. If a polyacrylate based polymer system is used, the laminated substrate may be subjected to a UV cure to effect polymerization. Alternatively, the substrate could be run though a pair of heated nip rollers to affect lamination, and UV cured thereafter.

When the polymer sheet is formed in situ, "flexibility" is no longer a requirement for the lamination process. Nevertheless, a polymer sheet formed in situ, which is thin enough to be flexible, provides desirable acoustic properties and manufacturing advantages.

EXAMPLE 4

Figure 3:
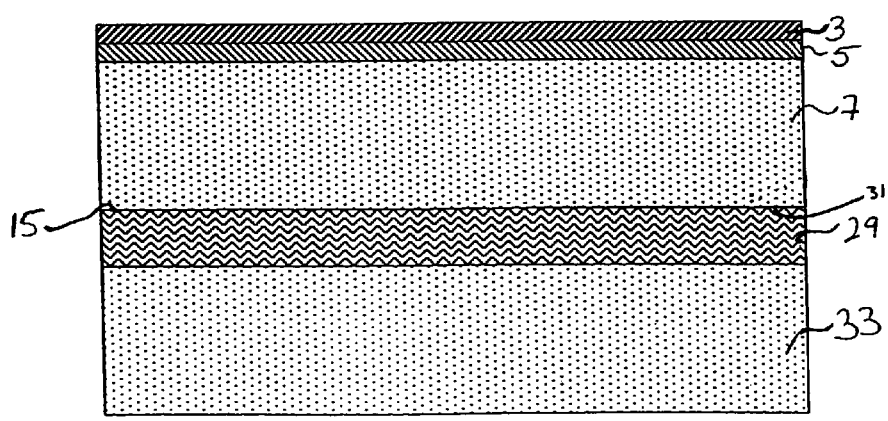
FIG. 3. is a cross-sectional view of a third embodiment of a touchscreen substrate of the present invention.

FIG. 3 illustrates a five-layer touchscreen substrate of the present invention, which has added strength and a safer fracture mechanism. These touchscreen substrates are particularly useful in applications which require immunity to water and increased strength such as outdoor information or ticketing kiosks in unsupervised locations.

The touchscreen substrate 27 comprises a microsheet 3, a polymer sheet 5, and a plate 7, which are the same as shown in FIG. 1. However, the touchscreen substrate 27 further includes an adhesive layer 29 with an upper surface 31, which is generally a non shear-wave-coupling material and a second plate 33. The adhesive layer 29 can be any type of contact adhesive. In one embodiment, the adhesive is a polyvinyl butyrate based adhesive commonly known as safety glass adhesive. The evanescent tail of the wave in the first plate 7 has essentially zero amplitude at the interface between the lower surface 15 of the plate 7 and the upper surface 31 of the adhesive layer. Therefore, the adhesive layer 29 has no effect on the propagation of the acoustic wave through the top three layers of the substrate. The adhesive layer 29, however, does provide the acoustic benefit of dampening any extraneous plate waves that may be excited in addition to the desired wave in the plate 7. The second plate 33 may be constructed from a material that is the same as or different than the material of plate 7, and may be constructed of glass, metal, ceramic, polymer, or any solid material with the desired mechanical and optical properties. The thickness of the second plate 33 may be the same as or different than the plate 7 and in a preferred embodiment is between about 1 to 12 mm. However, the construction and thickness of plate 33 is primarily dependent on the desired application.

EXAMPLE 5

An opaque touch sensor for use with an underwater robot is also contemplated by the present invention. A Rayleigh wave sensor cannot be used because water has a strong radiation damping effect. In contrast, the touch substrate of the present invention is well suited to an underwater application because of the water immunity of horizontally polarized shear waves such as Love waves.

A suitable three-layer touchscreen substrate for an undersea robot sensor may be composed of a thin metal microsheet, a thin polymer sheet, and a metal plate. In this example, it is contemplated that the polymer sheet is 32 micron thick polystyrene sheet as set forth in Example 1. For an undersea robot shell exposed to saltwater, a corrosion resistant and sturdy material is needed for the microsheet. One such metal is a nickel-copper alloy commercially available from Special Metals Corporation under the under the trade name Monel® 400. The bulk shear wave velocity of Monel® 400 is 2.7 mm/microsecond which is very close to the bulk shear wave velocity of the Schott AF-45 glass microsheet in Example 1. The metal plate may be a 3 mm thick stainless steel sheet with a bulk shear wave velocity of 3.1 mm/microsecond. Similarly, the bulk shear wave velocity of the stainless steel plate is similar to that of the soda-lime glass plate of the touchscreen substrate in Example 1. Accordingly, the ratio of the microsheet shear wave velocity to the plate shear wave velocity for this undersea touchscreen substrate is similar to that of the touchscreen substrate of Example 1, and thus, Love waves should be supported.

EXAMPLE 6

Figure 4:
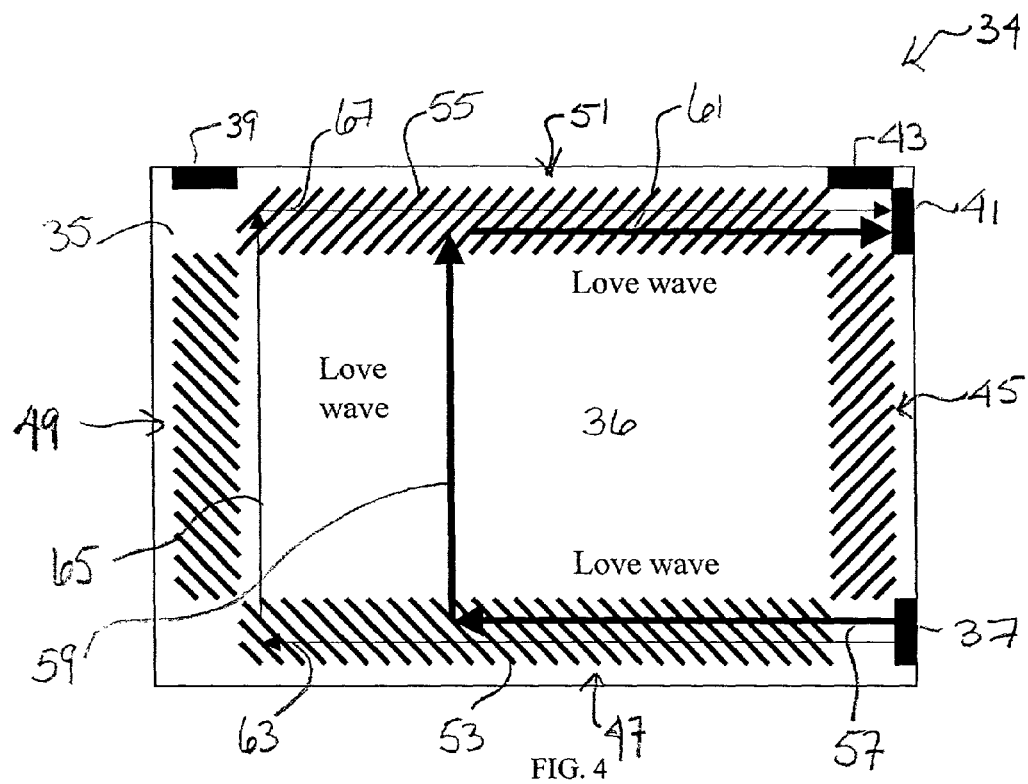
FIG. 4 is a top view of a Love-Love-Love touchscreen utilizing the substrate of FIG. 1 with transducers and reflectors disposed thereon.

FIG. 4 illustrates a Love wave touchscreen 34 intended for use with 15-inch liquid crystal display. The touchscreen is constructed using the substrate of Example 1 and using the Love wave mode for all portions of the acoustic paths. This is an example of a "Love-Love-Love" sensor.

In particular, the touchscreen 34 is comprised of a substrate 35, X and Y transmitting transducers 37 and 39, X and Y receiving transducers 41 and 43, and four reflective arrays 45, 47, 49, and 51. A touchscreen controller communicating with a host computer, not shown, that may include a microprocessor or the like, initiates a scan cycle of the touchscreen. The controller then applies a drive signal to the X transmitting transducer 37 through an X driver, not shown. The drive signal applied to the transducer 37 is a burst drive signal that generates a pulse of Love waves. The Love wave travels along the X transmit array 47 until it is reflected 90° by 45° reflectors 53. After propagating across the substrate surface 36, the receive array 51 again scatters the Love wave 90° using 45° reflectors 55. Receiving transducer 41 then converts the incident Love wave into an electrical signal containing touch information.

Arrows 57, 59, and 61 represent a typical acoustic path for the X signal. Arrows 63, 65, and 67 represent the longest acoustic path of the touchscreen. For a 15-inch touchscreen with the standard video rectangular aspect ratio of about three to four, this maximum acoustic path length includes an approximately 12-inch length along the X transmit array 47, an approximately 9-inch length across the substrate surface 36, and another approximately 12 inch length along the receive array 51, for a total of about 33 inches or about 840 mm. This is the maximum distance Love waves propagate in the sensor of this example.

Figure 5:
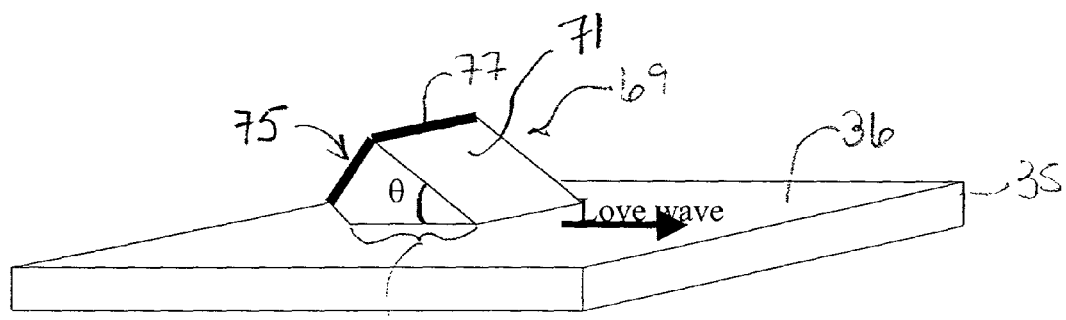
FIG. 5 is a perspective view of the substrate of FIG. 1 with a wedge-type transducer disposed thereon.

Various types of ultrasonic transducers for propagating Love waves are known. Transducers are a physical element or a set of elements, which converts energy from one form to another. This includes converting between acoustic wave modes and converting between electrical and acoustic energy. The transducers used in the present invention may be wedge-type Love wave transducers as shown in FIG. 5. Alternately, other known types of ultrasonic transducers may be used, including grating transducers and edge transducers using shear mode piezoelectric elements.

As shown in FIG. 5, a typical wedge transducer 69 consists of a plastic wedge 71 with a hypotenuse 73, a side 75, not shown, and a piezoelectric element 77 mounted to the side 75 of the wedge. The hypotenuse 73 of the wedge is adhered to the substrate 35. The piezoelectric element 77 is a shear wave mode element in which motion is in the horizontal direction. The piezoelectric element may be lithium niobate, a piezoelectric ceramic such as PZT, or polymer piezoelectric material. In transmit mode, the piezoelectric element 77 launches a bulk shear wave into the wedge material. The wedge angle θ is related to the wedge material's bulk shear (i.e. transverse) wave velocity, $V_T$, and the Love-wave phase velocity, Vp, in the standard manner: $\cos\theta = V_T/V_P$. For the thee-layer substrate of Example 1, the Love wave phase velocity at 5.53 MHz is computed to be 3.13 mm/μsec. The bulk shear wave velocity in the wedge material must be less than this value, as is the case for polymer materials, such as polystyrene, some glasses, and some metals such as brass. For example, a wedge constructed from Styron® 666 polystyrene manufactured by Dow Plastics has a shear wave velocity of 1.15 mm/μsec, thus implying a wedge angle of about 68°.

The arrays of 45° reflectors 45, 47, 49, and 51 may be fabricated by one of a variety of methods including, but not limited to, screen printing of high-temperature cure materials like glass frit, screen printing of composite polymer inks as described in U.S. Pat. No. 5,883,457 to Rinde et al., incorporated herein by reference, chemical etching as described in U.S. Pat. No. 5,648,643 to Knowles et al. incorporated herein by reference, and laser ablation. Factors to consider are the ability of the reflectors to scatter shear waves 90° as well as the order of manufacturing steps. In a preferred embodiment, the arrays 45, 47, 49 and 51 are chemically etched. Chemical etching is a low temperature process that allows the reflectors to be formed in the glass microsheet either before or after the lamination of the substrate of the present invention. Chemically etched reflectors have been previously used in shear wave acoustic touchscreens and are known to effectively reflect shear waves 90°.

The touchscreen of the present example is compatible with standard touchscreen controller products, such as the 2500 series IntelliTouch® controllers of Elo TouchSystems, Inc for two reasons. First, the touchscreen has high touch sensitivity despite the tendency of shear waves to have greatly reduced sensitivity relative to Rayleigh waves. Second, the touchscreen substrate of the present invention has low dispersion characteristics.

Rayleigh waves in homogenous substrates are non-dispersive, and, therefore, Rayleigh wave pulse shapes are stable as the waves propagate. In contrast, Love wave substrates are inherently dispersive, that is, different frequency components of a pulse propagate at different velocities, resulting in distorted pulse shapes. A surprising discovery was made with respect to the substrate of Example 1. In the neighborhood of the operating frequency, e.g. within the bandwidth of the controller electronics, it is possible to construct substrates for which the Love wave group velocity is essentially independent of frequency, and hence acoustic pulse shapes are stable. This discovery is supported by both the experimental and theoretical values given in Table II. Low dispersion Love-Love-Love sensors are possible with the substrates of this invention.

The dispersion effects of the touchscreen of the present invention are set forth in detail below. Consider an acoustic pulse of initial length $\Delta x$ after it propagates a distance L. The ratio of dispersion spreading to $\Delta x$ provides a measure of the strength of dispersion effects. Let $\Delta f$ be the bandwidth of an acoustic pulse. The duration of the initial pulse $\Delta t$ is inversely proportional to $\Delta f$, and hence $\Delta x$ is proportional to $Vg/\Delta f$. Furthermore, due to the finite bandwidth $\Delta f$, the group velocity will vary an amount $\Delta Vg = \Delta f \ast \partial Vg/\partial f$. After a distance L, the pulse will spread by approximately $L\ast(\Delta Vg/Vg) = L\ast(\Delta f/Vg)\ast\partial Vg/\partial f$. Thus the ratio of pulse spread to initial pulse length $\Delta x$ suggests a dispersion parameter D as follows.

$$D \propto L\ast(\Delta f/Vg)^2 \ast \partial Vg/\partial f$$

Based on a more rigorous theoretical analysis (not presented here) of the phase-error distortion within the frequency spectrum of an acoustic pulse, we define a dispersion parameter as follows.

$$D = \pi L (\Delta f/Vg)^2 \partial Vg/\partial f$$

This dispersion parameter D is the phase error, in radians, of frequency components that vary by $\pm \Delta f$ from the nominal operating frequency. When D is small compared to one, dispersion effects are small. When D is large compared to one, the touch dip shapes seen by the controller electronics will be significantly distorted.

For touchscreen design, the maximum acoustic path length provides an appropriate value of L to use in the above dispersion parameter formula. As noted above, the maximum acoustic path length for the 15-inch diagonal touchscreen of this example is about 840 mm.

The appropriate value of $\Delta f$ is determined largely by bandwidth of the controller, which in turn is related to the bandwidth of the receive circuit and the power spectrum of the burst circuit. In this example, we consider the case where $\Delta f/f = 2.7\%$. This bandwidth is in the range typical of present commercial touchscreen controller products.

As set forth above, the dispersion parameter D is a function not only of the basic substrate design, but also the size of the sensor as well as the electronics bandwidth. This motivates factoring the above dispersion parameter into a unitless dispersion parameter D' plus factors that depend on engineering choices not related to the basic construction of the substrate.

We define the unitless dispersion parameter D' as follows.

$$D' = \pi (V_{T0}/Vg)(f/Vg)\partial Vg/\partial f$$

Here f is the operating frequency and $V_{T0}$ is the bulk shear wave velocity in the deepest layer containing significant Love wave power, namely a plate of soda-lime glass plate in the present example. D' and D are related as follows.

$$D = (L/\lambda_{T0})(\Delta f/f)^2 D'$$

$\lambda_{T0}$ is the bulk shear wave wavelength in the deepest layer and is related to the frequency f and the shear wave velocity $V_{T0}$ by the equation $\lambda_{T0} = V_{T0}/f$. For the present example of a soda-lime glass plate and an operating frequency of 5.53 MHz, numerical values for $V_{T0}$ and $\lambda_{T0}$ are 3.40 mm/μsec and 0.615 mm respectively.

For the present example with L=840 mm, $\lambda_{T0}$=3.40 mm/μsec, and $\Delta f/f=2.7\%$, the factor $(L/\lambda_{T0})(\Delta f/f)^2$ equals one. Thus D and D' are numerically equal for the present example. For other sensor and controller designs, based on the same substrate construction, the scaling factor $(L/\lambda^{T0})(\Delta f/f)^2$ allows D to be easily computed from D'.

Figure 6:
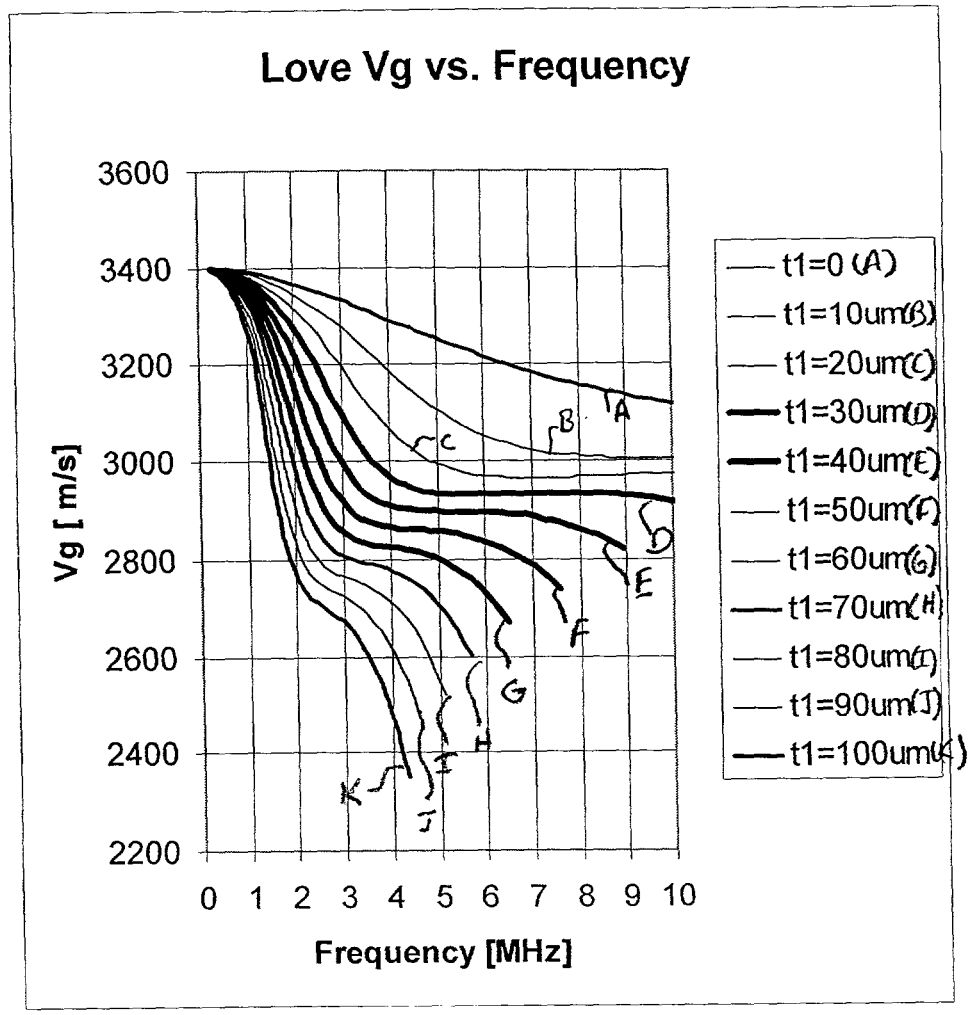
FIG. 6 is a plot of computed group velocities for a Love-Love-Love substrate as a function of frequency for varying thicknesses of the polymer sheet of FIG. 1.

The graph in FIG. 6 plots computed group velocities as a function of frequency for the substrate of Example 1 except that the polymer layer thickness $t_1$ is varied. Between 5 and 6 MHz, the curves for 30 and 40 micron thick polystyrene are surprisingly flat. With an operating frequency of 5.53 MHz and a polystyrene thickness of 32 microns, the substrate of Example 1 lies in this region of low dispersion. The computed value of D is less than 0.1 and indeed is small compared to one. As shown in FIG. 6, a Love wave supporting substrate as in Example 1, modified to have a 20 micron thick polystyrene layer, may be used to construct a low-dispersion Love-wave touchscreen operated at 8 MHz.

More generally, given the choice of materials used to construct a three-layer substrate of the present invention, plots of group velocity versus frequency may be computed for different choices of layer thicknesses. From such plots, regions of low group velocity dispersion may be identified. When a combination of substrate thicknesses providing low dispersion at a desirable frequency is found, the dispersion parameter D is used to quantify the low-dispersion characteristic of the design. By this method, a variety of low-dispersion Love-Love-Love sensors may be designed.

EXAMPLE 7

Touchscreen substrates, such as the substrate of Example 1, not only support Love waves, but also support Rayleigh-like modes having longitudinal and vertical shear components of motion. In the Love-Love-Love sensor of Example 6, Rayleigh-like modes serve no useful purpose, and can lead to undesired parasitic acoustic signal paths. Understanding and controlling the properties of Rayleigh-like modes is necessary to the design of Love wave substrates.

Particularly troublesome are parasitic acoustic paths in which a water-sensitive Rayleigh-like mode traverses the touch region. It is possible for Love waves from the transmit transducer to be scattered and mode converted into Rayleigh-like modes traversing the touch region. These parasitic Rayleigh-like modes may in turn be converted back to Love waves by the receive array and detected by the receive transducer. Alternately, it is possible for Love wave transducers to have some coupling to Rayleigh-like modes as well as Love waves, in which case there is an all Rayleigh parasitic acoustic path between transmit and receive transducers. Such parasitic acoustic signals may be suppressed with appropriate placement of acoustic dampers that absorb Rayleigh-like waves more strongly than Love waves. However, it is often most cost-effective to limit the generation of parasitic acoustic signals in the first place. If such a parasitic signal exists and interferes with the intended Love wave signal as it is received by controller electronics, and if the Rayleigh-like mode is sensitive to water, then the received touchscreen signal may become water sensitive. The water-immune benefits of the Love wave substrate may be lost.

Reflective array designs are tuned to coherently scatter the desired mode and suppress undesired modes. Mode selection mechanisms often depend on phase velocity differences. The reflector spacing selects the desired phase velocity of the mode traveling along the axis of the arrays. Reflector angle selects the phase velocity of the mode scattered at 90° to and from the touch region. Parasitic mode suppression is more difficult when a parasitic mode has phase velocity close to that of the desired mode.

Figure 7:
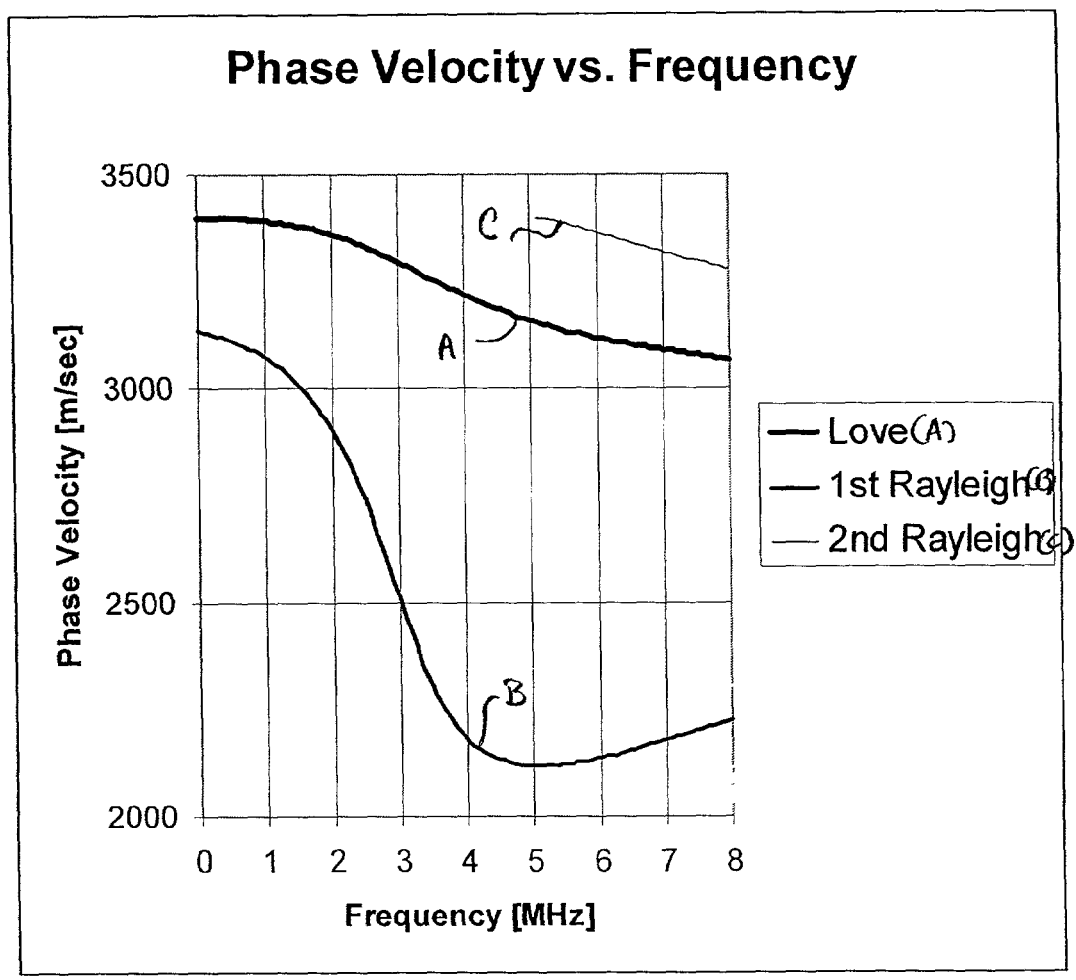
FIG. 7 is a plot of computed phase velocities for a substrate of the present invention versus frequency for Love waves and Rayleigh-like waves.

Given the discussion above, it is preferable in a Love-Love-Love touchscreen substrate to have a minimum number of extraneous Rayleigh-like modes, and for remaining Rayleigh-like modes to have phase velocities very different from the Love wave phase velocity. As shown in FIG. 7, computed phase velocities for the substrate of Example 1 are plotted versus frequency for the Love wave as well as the two lowest Rayleigh-like acoustic modes.

For the Love-Love-Love substrate of Example 6 above, the operating frequency is 5.53 MHz and two Rayleigh-like modes are present. The Love wave phase velocity is much closer to second Rayleigh-like mode than the first. In the present example, the second Rayleigh-like mode is eliminated by dropping the operating frequency from 5.53 MHz to 4.5 MHz, which leaves a clean system with only one Rayleigh-like mode that is well separated from the Love wave in phase velocity. The lowest Rayleigh-like mode has a cut-off frequency of zero, and is always present. This example represents the minimum number, i.e. one, of extraneous surface-bound acoustic modes. A detailed discussion of methods to deal with increased Love wave dispersion resulting in this change in operating frequency is set forth in Example 8 below.

A general scaling law was discovered as a result of the above mathematical analysis. Increasing layer thicknesses by a given factor has the same effect on mode velocities as decreasing the operating frequency by the same factor. For example, the present 4.5 MHz example has the same modes and mode velocities as a sensor operating at 5.53 MHz and having reduced glass microsheet and polymer thicknesses of 81 and 26 microns, respectively.

In the case that the substrate of Example 1 forms part of a safety-glass lamination as in Example 4, the safety-glass adhesive dampens any plate waves in the glass plate. In this case, 4.5 MHz operation provides only one parasitic mode of any type. In practical engineering terms, this class of substrate designs with only one surface-bound parasitic mode can be generalized. For reasons given below, parasitic modes become less important as one approaches their cut-off frequency. Thus even the 5.53 MHz sensor of Example 6 approximates a sensor with only one parasitic surface-bound mode.

As one approaches the cut-off frequency from above, the second mode frequency approaches the glass plates bulk shear velocity, and the penetration depth of the mode becomes infinite. This has two effects that reduce the modes importance as a surface-bound parasitic mode. A deeply penetrating mode has relatively little power density at the surface. Low surface power density leads to weak coupling to reflective arrays and transducer structures on the surface. Furthermore, in practice for the case of the safety glass lamination of Example 4, a deeply penetrating mode will be damped by the safety glass adhesive.

For a given layered substrate design, the cut-off frequency for the second Rayleigh-like mode may be determined by numerical computation using sophisticated computer code. However, as discussed below, we have found that with much less effort, it is possible to estimate the cut-off frequency to a reasonable accuracy.

As one approaches the cut-off frequency from above, the second Rayleigh-like mode becomes essentially independent of coordinates in the plane of the substrate and motion becomes one-dimensional in the direction normal to the surface. The glass microsheet and polymer layer closely approximate a simple mass-on-a-spring oscillator. Per unit area, the glass microsheet of density $p_2$ and thickness $t_2$ has a mass $m=\rho_2 t_2$. The polymer layer of thickness $t_1$ density $\rho_1$ and pressure wave velocity $V_{L1}$ approximates a spring with a spring constant $k=\rho_1 V_{L1}^2/t_1$. According to basic physics principles, the corresponding resonant frequency, and hence an estimate for the second mode cut-off frequency may be determined as follows.

$$f_{cut-off} \approx (V_{L1}/2\pi) * \sqrt{(\rho_1/(\rho_2 t_1 t_2))}$$

This estimate assumes that the glass plate is a "brick wall" that does not move. In fact, close to the cut-off frequency, the second Rayleigh mode involves motion at the top of the glass plate that is 180° out of phase from the motion of the glass microsheet, and there is a node plane of zero motion within the polymer sheet. It is this node plane that best approximates a motionless "brick wall" for the mass-on-spring calculation, and hence is the thickness of the polymer above the node plane, not the larger quantity $t_1$, that properly belongs in the above equations. For this reason, the above estimate is a lower limit. For the substrate of Example 1, this formula estimates a cut-off frequency of 4.2 MHz which is indeed close to, but somewhat below, the cut-off frequency of about 5.0 MHz seen in the above plot.

The above resonance estimate can be significantly improved if one models the system as two masses connected by a spring where the second mass M is the effective mass of the glass plate. A reasonable estimate of the effective mass of the glass plate is that mass to a depth equal to a quarter wavelength of a pressure wave at the resonant frequency, namely $M=(\frac{1}{4})\rho_0(V_{LO}/f)$. Using this estimate of the mass of the glass plate that participates in the resonant oscillation, the cut-off frequency for the substrate of Example 1 is computed to be 4.97 MHz. This more refined method for estimating the cut-off frequency was found to agree with detailed numerical simulations to better than 10% for a number of different substrate designs.

EXAMPLE 8

As in Example 7, Rayleigh-like waves that propagate in the layered substrates of this invention are again considered. However, in this example, we consider touch sensors in which the Rayleigh-like waves are the desired waves for touch sensing. That is, a Rayleigh-Rayleigh-Rayleigh touchscreen is constructed from the layered substrate of the present invention.

At first glance, there may appear to be little value in such a Rayleigh-Rayleigh-Rayleigh touchscreen. In contrast to a Love-Love-Love touchscreen, no use is made of the water-immune Love wave mode. Furthermore, commercially acceptable Rayleigh-Rayleigh-Rayleigh touchscreens may be constructed more simply using a homogenous substrate. However, for some applications, it is advantageous to take advantage of the modified properties of Rayleigh waves in layered substrates.

Figures 8A, 8B:
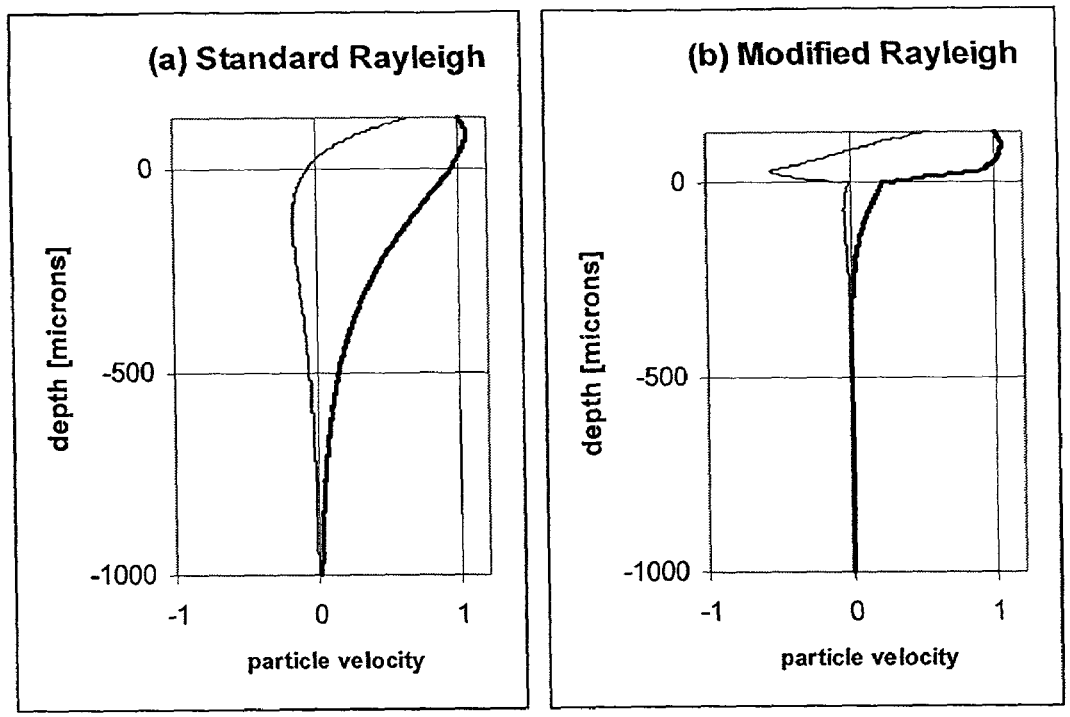
FIG. 8A is a depth profile for a standard Rayleigh wave in a homogenous substrate.
FIG. 8B is a depth profile for the lowest order Rayleigh-like wave in the substrate of FIG. 1.

FIGS. 8a and 8b illustrates the depth profiles of particle motion for Rayleigh waves in two different substrates. FIG. 8a illustrates the depth profile of a standard Rayleigh wave in a homogenous substrate. This is the acoustic mode most commonly used in prior art acoustic touchscreens. FIG. 8b illustrates the depth profile for the lowest order Rayleigh-like mode in the preferred substrate of Example 1. The vertical axis is the coordinate perpendicular to the touch surface. The origin is defined to be at a depth of 132 microns, i.e. the top of the glass plate for the layered substrate. The horizontal axis is particle velocity. The vertical and longitudinal components of particle velocity correspond to the heavy and light curves respectively. The vertical component of the particle velocity at the surface is normalized to one. The power of the Rayleigh-like wave in the substrate of the present invention is much more concentrated near the touch surface than a Rayleigh wave in a standard substrate, this provides advantages for some applications.

In this example, a 15-inch touchscreen operating at 5.53 MHz is constructed using a modified version of the substrate of Example 1. The thickness of the glass plate is reduced from 3 mm to 0.7 mm making the resulting substrate less than 1 mm thick. As discussed in Example 6, reflector arrays and transducers may be provided by a variety of methods. Such a touchscreen substrate has a number of advantages relative to the prior art Rayleigh-wave acoustic touchscreens.

The homogenous substrates used in the prior art Rayleigh wave touchscreens needed to be a minimum of about 2 mm thick (3 to 4 Rayleigh wavelengths) in order to cleanly propagate the Rayleigh wave. For 5.53 MHz operation, the component of the Rayleigh wave that decays most slowly with depth has an exponential decay length of about 230 microns. Many decay lengths are needed to decouple the top and bottom surfaces of the glass plate. For the multilayer substrates of Example 1, this exponential decay length shrinks to 78 microns, and hence the glass plate thickness may be reduced by a factor of 3. Such differences in depth profiles are clearly seen in FIGS. 8a and 8b. Thus, this example provides a Rayleigh-Rayleigh-Rayleigh touchscreen of significantly reduced thickness. As a result of the reduced thickness, the Rayleigh-Rayleigh-Rayleigh touchscreen also has reduced weight. The present invention enables the weight of a Rayleigh-Rayleigh-Rayleigh touchscreen substrate to be reduced by a factor of two or more, which is especially beneficial for handheld computer applications. Finally, the reduced thickness results in increased sensitivity due to the shallower depth profile of the Rayleigh wave acoustic power. Thus, the present invention provides a means of increasing the sensitivity of Rayleigh-like modes without modification of the operating frequency.

Unfortunately, the dispersion parameter for this particular Rayleigh-Rayleigh-Rayleigh touchscreen is about 3 which is rather strong. However, there are several ways to deal with this large value of the dispersion parameter. Dispersion distorts the shape of touch dips in the received signal. While this complicates extraction of touch information, the touch information is still contained within the received signal. If this received signal is digitized at a sampling rate that is fast compared to the 5.53 MHz operating frequency, the full information content of the received signal is retained. The touch information can then be extracted with sufficiently sophisticated mathematically processing with digital electronics. The touchscreen in this example is operated with electronics having such digitizing and digital signal processing capabilities.

Figure 9:
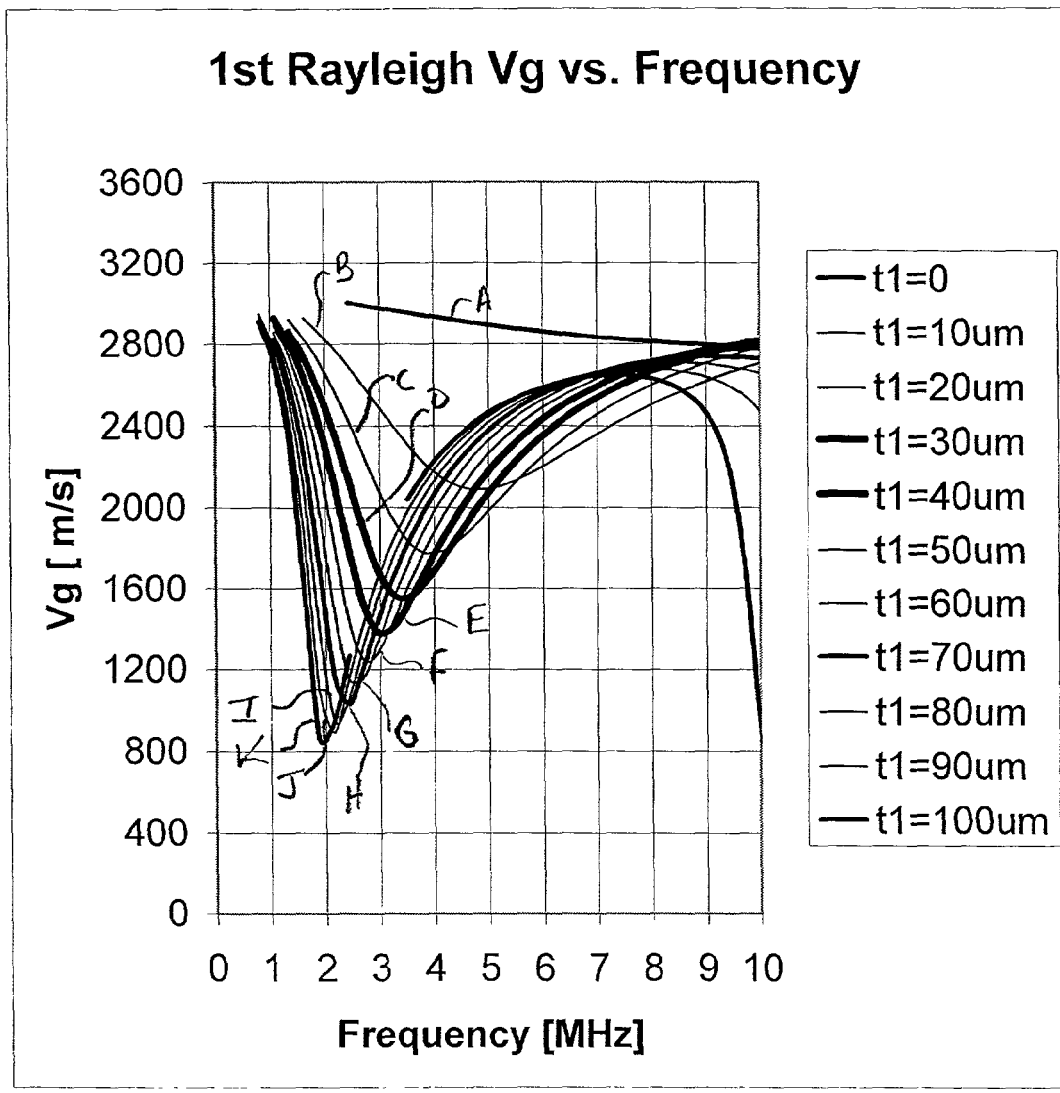
FIG. 9 is plot of Rayleigh-like wave group velocity as function of frequency for modified versions of the substrate of FIG. 1 with varying polymer sheet thicknesses.

An alternate approach is to redesign the substrate to reduce the value of the dispersion parameter. A shown in FIG. 9, which is similar to the plot in FIG. 6 for the Love wave mode, group velocity is plotted as a function of frequency. Again, different curves correspond to different thickness of the polymer layer. The vertical scale change is to accommodate the strong variations of Rayleigh wave group velocity. The dispersion parameter is zero at a minimum. As the polymer thickness is decreased, the minimum moves towards higher frequencies. With a polymer layer thickness somewhat less than 10 microns, the minimum in group velocity moves to 5.53 MHz. Alternately, other design parameters, such as the microsheet thickness and the acoustic properties of the various layers, may be used to tune the value of the dispersion parameter to zero at the desired operating frequency.

Furthermore, it is an option to tune the dispersion parameter by adjusting the operating frequency, or a combination of the operating frequency and substrate design parameters. For the substrate of Example 1, a minimum of group velocity can be tuned in by dropping the operating frequency to somewhere near 3.5 MHz. Alternatively, the dispersion parameter can be zeroed by dropping the operating frequency to 4.0 MHz and reducing the polymer layer thickness to about 20 microns.

Figure 10:
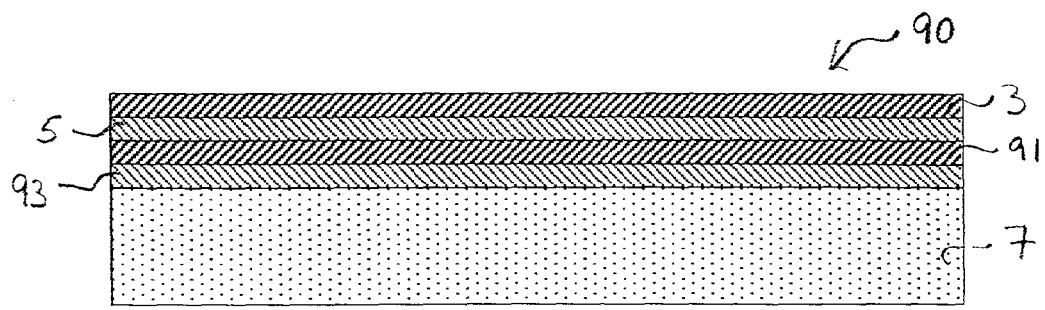
FIG. 10 is a cross-sectional view of a fourth embodiment of a touchscreen substrate of the present invention.

Depending on the product design goals, available materials, and the manufacturing processes, the touchscreen engineer may explore a variety of design approaches to control the effects of dispersion. For example, as shown in FIG. 10, the substrate 90 based on the substrate of Example 1 may include an additional microsheet 91 and additional polymer sheet 93. This increases the number of adjustable substrate design parameters available to the touchscreen design engineer. In one embodiment, the substrate includes a first microsheet 20 microns thick, a first polystyrene sheet 25 microns thick, a second microsheet 90 microns thick, a second polystyrene sheet 10 microns thick, and a glass plate.

Figure 11:
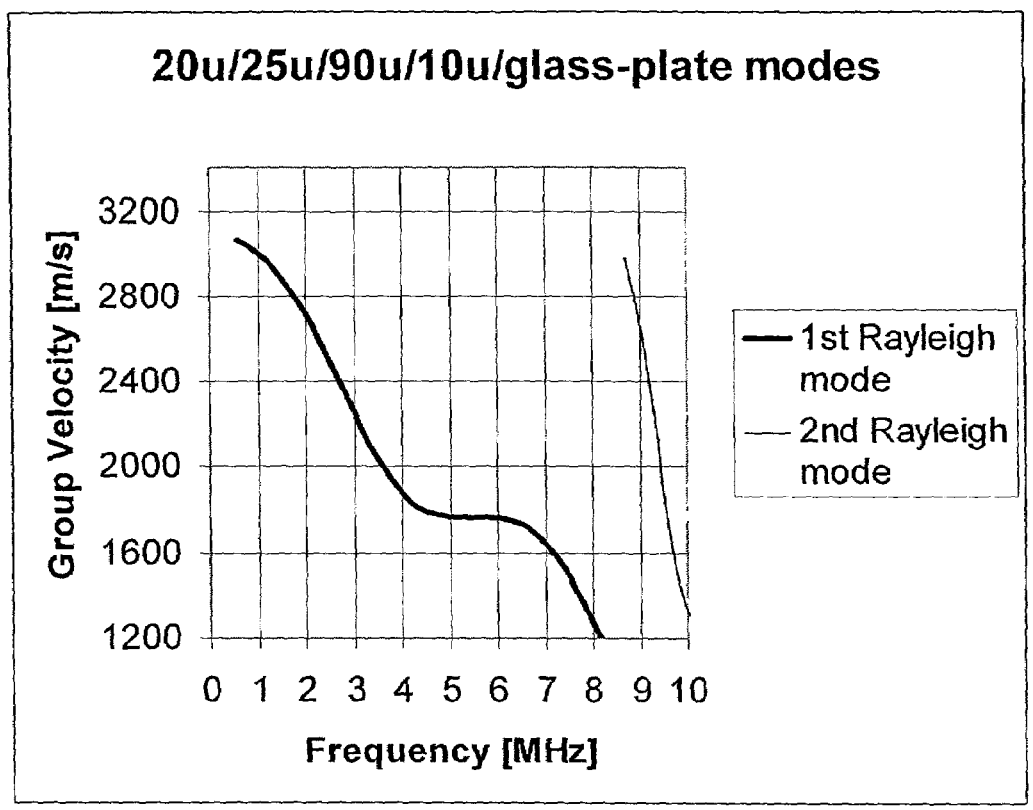
FIG. 11 is a plot of Rayleigh-like wave group velocity as a function of frequency for one embodiment of the substrate shown in FIG. 10.

FIG. 11 is a plot of Rayleigh-like wave group velocity as a function of frequency for this substrate, based on the assumption that each layer of the substrate has the same acoustic properties as set forth in Table II. The group velocity is essentially constant between 5 and 6 MHz, and that there is only one Rayleigh-like mode in this frequency range. Therefore, as shown in FIG. 11, a Rayleigh-like wave touchscreen built of such this substrate operating at 5.53 MHz and has very low dispersion.

EXAMPLE 9

Figure 12:
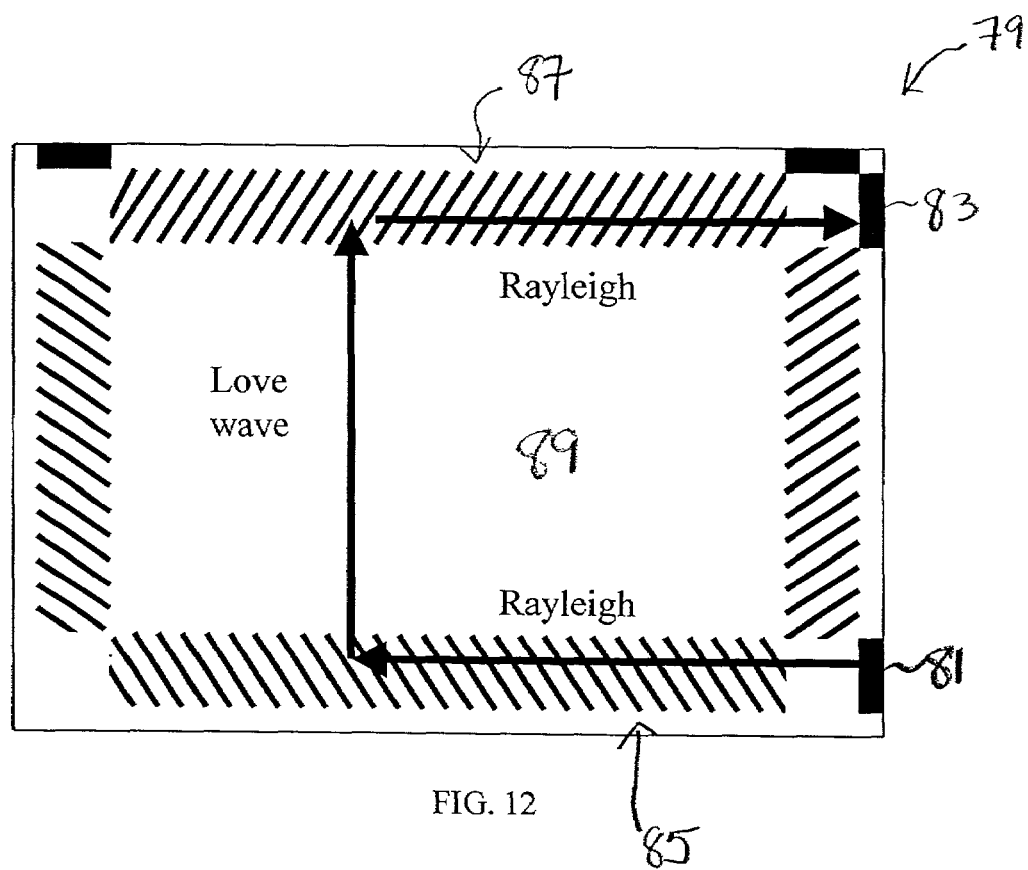
FIG. 12 is top view of a Rayleigh-Love-Rayleigh touchscreen utilizing the substrate of FIG. 1 with transducers and reflectors disposed thereon.

In this example, a touchscreen similar to that in Example 6 is considered. A 15-inch transparent touchscreen is constructed of the substrate of Example 1, and touches are detected using water-immune Love waves. However, as shown in FIG. 12, the touchscreen 79 is a Rayleigh-Love-Rayleigh rather than a Love-Love-Love sensor.

While touches are detected using Love waves, transducers 81 and 83 are designed to transmit and receive Rayleigh-like waves. The lowest Rayleigh-like wave has a computed phase velocity 2124 m/sec along arrays 85 and 87. The Love wave has a much different computed phase velocity at 5.53 MHz of 3134 m/sec. As mode conversion is desired, the reflector angle is not 45°, but rather set equal to the inverse tangent of the ratios of the phase velocities, i.e., arctan (3134/2124) or approximately 56°.

The basic water-immune benefits in the touch area 89 of the touchscreen 79 are provided by both the Love-Love-Love touchscreen of Example 6 and this Rayleigh-Love-Rayleigh example. The optimal choice between these two approaches depends on the details of the manufacturing processes and desired features of product design. Thus, both options are contemplated by the present invention.

In a preferred embodiment the substrate of Example 1 at an operating frequency of 5.53 MHz is used. However, as discussed in Example 7, it may be desirable to eliminate all surface bound acoustic modes except for the Love mode and the lowest Rayleigh mode. This can be done be reducing the operating frequency or redesigning the layered substrate.

Another design consideration is dispersion. All the options considered in previous examples are relevant. This includes smart electronics that correct the dispersion effects, modification of the operating frequency, and redesign of the substrate.

For Rayleigh-Love-Rayleigh touchscreen substrates, the dispersion parameters for both the Love wave and the Rayleigh-like wave are relevant. Theoretical investigations have demonstrated that it is mathematically possible to design three-layer substrates for which the dispersion parameter is zero at the desired frequency for both modes. Feasibility of such designs may be evaluated for any given set of practical limitations on the range of acoustic properties of conveniently available materials. For a given set of conveniently available materials, additional options are provided by the additional layers as shown in FIG. 10. The optimal choice between Love-Love-Love and Rayleigh-Love-Rayleigh designs is affected by the ease or difficulty of simultaneously achieving low dispersion for both modes. Finally, in the case of Rayleigh-Love-Rayleigh sensor for which dispersion parameter for the two modes are not zero and have opposite algebraic signs the dispersion effects of the two modes tend to cancel.

While the above description constitutes the preferred embodiments of the present invention, it will be appreciated that the invention is susceptible to modification, variation, and change without departing from the proper scope and fair meaning of the accompanying claims.

The invention claimed is:

1. An acoustic touch sensor substrate comprising:
   a first shear supporting sheet comprising an upper surface and a lower surface, said upper surface comprising a touch surface;
   a shear supporting plate; and
   a second flexible sheet (i) comprising a shear supporting polymer positioned between said first sheet and said plate, and (ii) having a thickness of about 10 to 100 microns.

2. An acoustic touch sensor substrate comprising:
   a first shear supporting sheet comprising an upper surface and a lower surface, said upper surface comprising a touch surface;
   a shear supporting plate; and
   a second flexible sheet comprising a shear supporting polymer (i) positioned between said first sheet and said plate and (ii) having a glass transition temperature above about 260° K.

3. The acoustic touch sensor substrate of claim 2, wherein said shear supporting polymer is selected from the group consisting of polystyrene, polyacrylate, polycyclic olefins, polyether sulfones, and mixtures thereof.

4. An acoustic touch sensor substrate comprising:
   a first shear supporting sheet comprising an upper surface and a lower surface, said upper surface comprising a touch surface;
   a shear supporting plate; and
   a second flexible sheet comprising a shear supporting polymer positioned between said first sheet and said plate,
said first sheet and the plate having bulk shear wave velocities, and the bulk shear wave velocity of the sheet being slower than the bulk shear wave velocity of the plate.

5. The acoustic touch sensor substrate of claim 4, wherein the bulk shear wave velocity of said first sheet is more than about 5% slower than the bulk shear wave velocity in said plate.

6. An acoustic touch sensor substrate comprising:
   a first shear supporting sheet comprising (i) an upper surface and a lower surface, said upper surface comprising a touch surface, and (ii) glass having a thickness of about 100 microns;
   a shear supporting plate having a thickness greater than about 0.5 mm and comprising glass having a thickness greater than about 0.5 mm; and
   a second flexible sheet comprising (i) a shear supporting polymer positioned between said first sheet and said plate and (ii) polystyrene having a thickness of about 32 microns.

7. An acoustic touch sensor substrate comprising:
   a first shear supporting sheet having a thickness less than about 300 microns;
   a shear supporting plate having a thickness less than about 12 mm; and
   a second sheet comprising a shear supporting polymer disposed between said first sheet and said plate, said second sheet having a thickness less than about 100 microns.

8. An acoustic touch system comprising:
   a touch substrate comprising:
   a first sheet having a shear supporting touch surface;
   a shear supporting plate; and
   a second flexible sheet comprising a shear supporting polymer positioned between said first sheet and said plate; and
   electronic circuitry which corrects for dispersion effects.

9. The acoustic touch system of claim 8, wherein the electronic circuitry corrects the dispersion effects with digital signal processing.

10. An acoustic touch sensor substrate comprising
- a first shear supporting sheet comprising an upper surface and a lower surface, said upper surface comprising a touch surface;
- a shear supporting plate; and
- a second flexible sheet comprising a shear supporting polymer positioned between said first sheet and said plate, said substrate supporting Rayleigh waves operating at a frequency having a dispersion parameter less than or equal to one and only one surface-bound Rayleigh wave existing at the desired operating frequency.

11. An acoustic touch sensor substrate comprising:
- a first shear supporting sheet comprising an upper surface and a lower surface, said upper surface comprising a touch surface;
- a shear supporting plate; and
- a second flexible sheet comprising a shear supporting polymer positioned between said first sheet and said plate, said substrate supporting Rayleigh waves operating at a frequency (i) having a dispersion parameter less than or equal to one and (ii) being within about 30% of a cut-off frequency of a second Rayleigh wave.

* * * * *